United States Patent
Zhang

(10) Patent No.: US 9,746,834 B2
(45) Date of Patent: Aug. 29, 2017

(54) SELF-RECHARGING ELECTRONIC WATCH

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Xue-Qin Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/072,885

(22) Filed: Mar. 17, 2016

(65) Prior Publication Data

US 2017/0192395 A1    Jul. 6, 2017

(30) Foreign Application Priority Data

Dec. 31, 2015  (CN) .......................... 2015 1 1032415

(51) Int. Cl.
| | |
|---|---|
| *H01R 9/24* | (2006.01) |
| *G04G 19/00* | (2006.01) |
| *G04G 21/08* | (2010.01) |
| *G06F 3/041* | (2006.01) |

(52) U.S. Cl.
CPC ............. *G04G 19/00* (2013.01); *G04G 21/08* (2013.01); *G06F 3/0416* (2013.01); *G06F 2203/04102* (2013.01)

(58) Field of Classification Search
CPC .................... G04G 19/00; G04G 21/08; G06F 2203/04102; G06F 3/0416; G06F 1/163; H04M 1/72527; H04B 5/0037; H05K 1/189
USPC .......................................................... 439/889
See application file for complete search history.

(56) References Cited

U.S. PATENT DOCUMENTS

| | | | |
|---|---|---|---|
| 2015/0133193 A1* | 5/2015 | Stotler | G06F 1/163 455/557 |
| 2015/0181013 A1* | 6/2015 | Mit | H04M 1/72527 455/556.1 |
| 2015/0378391 A1* | 12/2015 | Huitema | G06F 1/163 361/679.03 |
| 2017/0006414 A1* | 1/2017 | Tomassini | H04B 5/0037 |
| 2017/0034918 A1* | 2/2017 | Huitema | H05K 1/189 |

* cited by examiner

*Primary Examiner* — Jean F Duverne
(74) *Attorney, Agent, or Firm* — Steven Reiss

(57) ABSTRACT

A self-recharging electronic watch includes a receiving body, a watch strap, at least one flexible touch screen, a processor, and at least one battery. The watch strap, which includes at least one temperature difference power generator, holds the electronic watch to wrist of user and gathers its heat. The at least one flexible touch screen is arranged to cover an outside surface of the watch strap. The processor in a receiving space of the receiving body controls the flexible touch screen to display time and other information to user and can receive audible and other input from user. The battery is arranged in the receiving space and receives electrical power from the at least one temperature difference power generator.

11 Claims, 3 Drawing Sheets

SELF-RECHARGING ELECTRONIC WATCH

CROSS-REFERENCE TO RELATED APPLICATIONS

This application claims priority to Chinese Patent Application No. 201511032415.8 filed on Dec. 31, 2015, the contents of which are incorporated by reference herein.

FIELD

The subject matter herein generally relates to battery-powered watches, and more specifically, relates to an electronic watch with its own built-in recharging function powered by temperature differences.

BACKGROUND

Electronic devices include a processor. Some Electronic devices include a battery or other energy source. The battery or energy source requires recharging.

BRIEF DESCRIPTION OF THE DRAWINGS

Implementations of the present disclosure will now be described, by way of example only, with reference to the attached figures.

DETAILED DESCRIPTION

Figure 1:
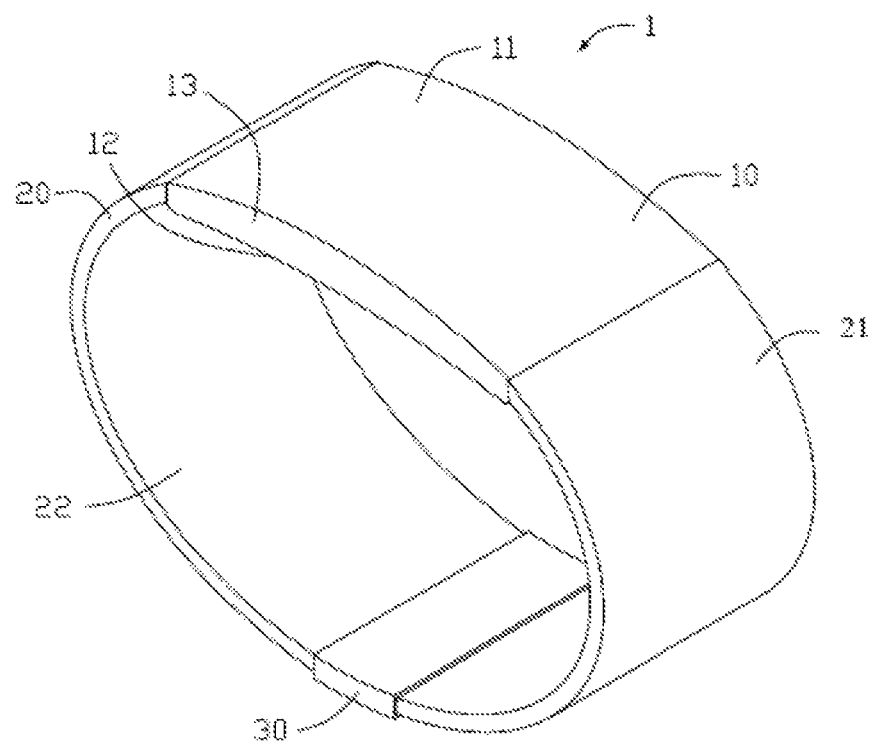
FIG. 1 is a diagrammatic view of a self-recharging electronic watch with charging function via temperature difference.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features.

The present disclosure, including the accompanying drawings, is illustrated by way of examples and not by way of limitation. Several definitions that apply throughout this disclosure will now be presented. It should be noted that references to "a/an" or "one" embodiment in this disclosure are not necessarily to the same embodiment, and such references mean "at least one." The term "comprising" means "including, but not necessarily limited to"; it specifically indicates open-ended inclusion or membership in a so-described combination, group, series and the like.

Furthermore, the term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a self-recharging electronic watch. The self-recharging electronic watch includes a receiving body, a watch strap, and at least one flexible touch screen. The receiving body defines a receiving space. The watch strap can connect to the receiving body and is together with the receiving body to hold the electronic watch to a wrist of a user. The watch strap includes at least one temperature difference power generator. The at least one flexible touch screen is arranged to cover an outside surface of the watch strap. The outside surface of the watch strap is opposite to an inside surface of the watch strap, and the inside surface makes contact with the wrist of the user. A processor of the self-recharging electronic watch is arranged in the receiving space of the receiving body and connected to the at least one flexible touch screen. The processor controls the flexible touch screen to display information and receive commands in responses to touch operations. A battery device of the self-recharging electronic watch is arranged in the receiving space and can supply electric power for the at least one flexible touch screen and the processor. The at least one temperature difference power generator is connected to the battery device and configured to supply power to the battery device.

FIG. 1 is a diagrammatic view of a self-recharging electronic watch with charging function via temperature difference. The self-recharging electronic watch 1 includes a receiving body 10, a watch strap 20, and a connection element 30. In the embodiment, the electronic watch 1 is a wrist watch. The watch strap 20 can hold the self-recharging electronic watch 1 to a human wrist (not shown) via the connection element 30. The watch strap 20 includes two segments. The two segments can close together via the connection element 30. The connection element 30 can be a buckle.

The receiving space 10 includes an outside surface 11, an inside surface 12, and a receiving space 13. The watch strap 20 includes an outside surface 21 and an inside surface 22. The inside surfaces 11, 12 make contact with the skin of the wrist. The outside surfaces 12, 22 are opposite to the inside surface 11, 12 and are far away from the wrist.

Figure 2:
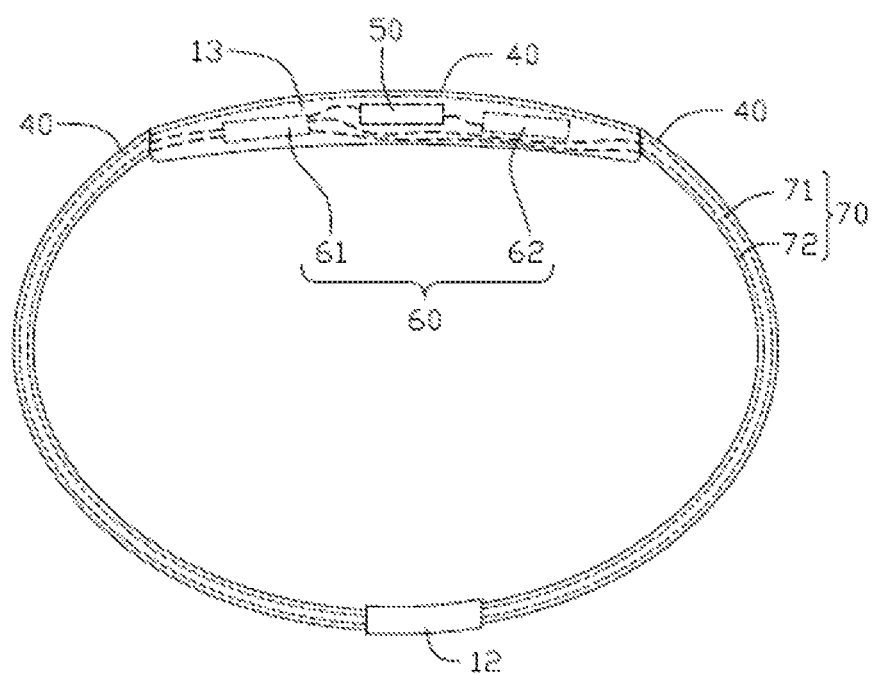
FIG. 2 is a cross-sectional view of the self-recharging electronic watch in FIG. 1.

FIG. 2 is a view of the self-recharging electronic watch 1 shown in FIG. 1. The self-recharging electronic watch 1 further includes at least one flexible touch screen 40. The flexible touch screen 40 can receive touch operations and generate signals in response to the received touches. The flexible touch screen 40 further can display information to users. In the embodiment, the self-recharging electronic watch 1 includes one flexible touch screen 40. The flexible touch screen 40 can be arranged to cover the receiving body 10 and at least one segment of the watch strap 20. In other embodiment, the self-recharging electronic watch 1 includes more than one flexible touch screen 40. A first flexible touch screen 40 is arranged to cover the receiving body 10 and a second flexible touch screen 40 is arranged to cover one segment of watch strap 20. Moreover, a third flexible touch screen 40 is arranged to cover another segment of watch strap 20.

The self-recharging charging watch 1 includes a processor 50 and a battery device 60. The processor 50 and the battery device 60 are received in the receiving space 13. The battery device 60 can supply power for the processor 50. The processor 50 can be a central processing unit (CPU), a microprocessor, or other data processor chip that performs functions of the self-recharging charging watch 1.

The self-recharging charging watch 1 includes at least one temperature difference power generator 70. Each of the temperature difference power generators 70 includes a first semiconducting material 71 and a second semiconducting material 72. In at least one embodiment, the watch strap 20 is made of the first semiconducting material 71 and the second semiconducting material 72. The first semiconducting material 71 and the second semiconducting material 72 are arranged under the flexible touch screen 40. That is, the flexible touch screen 40 is on the outside surface 21 of the watch strap 20 and the second semiconducting material 72 forms the inside surface 22 of the watch strap 20. The first semiconducting material 71 is sandwiched between the flexible touch screen 40 and the second semiconducting material 72. In other embodiments, the first semiconducting material 71 is sandwiched between the flexible touch screen 40 and the outside surfaces 12, 22 of the self-recharging charging watch 1. The second semiconducting material 72 is sandwiched between the outside surfaces 11, 21 and the inside surfaces 12, 22 of the self-recharging charging watch 1. The first semiconducting material 71 is adjacent to the flexible touch screen 40. The second semiconducting material 72 is adjacent to the wrist. The first semiconducting material 71 connects to the second semiconducting material 72, directly or by wires. A length and width of the first semiconducting material 71 and the second semiconducting material 72 correspond to the dimensions of the watch strap 20. The length and width of the watch strap 20 can be as needed.

The first semiconducting material 71 and the second semiconducting material 72 connects to the battery device 60 received in the receiving space 13 by wires. Thus, the temperature difference power generator 70 can generate electrical power and supply the generated power for the battery device 60 when there is temperature difference between first semiconducting material 71 and the second semiconducting material 72.

In other embodiments, each segment of the watch strap 20 includes more than one temperature difference power generator 70. The temperature difference power generators 70 can connect to each other in series or in parallel.

In the embodiment, the battery device 60 includes a first battery 61 and a second battery 62. The first battery 61 connects to temperature difference power generators 70 arranged in the watch strap 20 and accepts power generated by the temperature difference power generators 70. The second battery 62 can connect to a power charging circuit (not shown). The power charging circuit can connect and supply power to the second battery 62.

Figure 3:
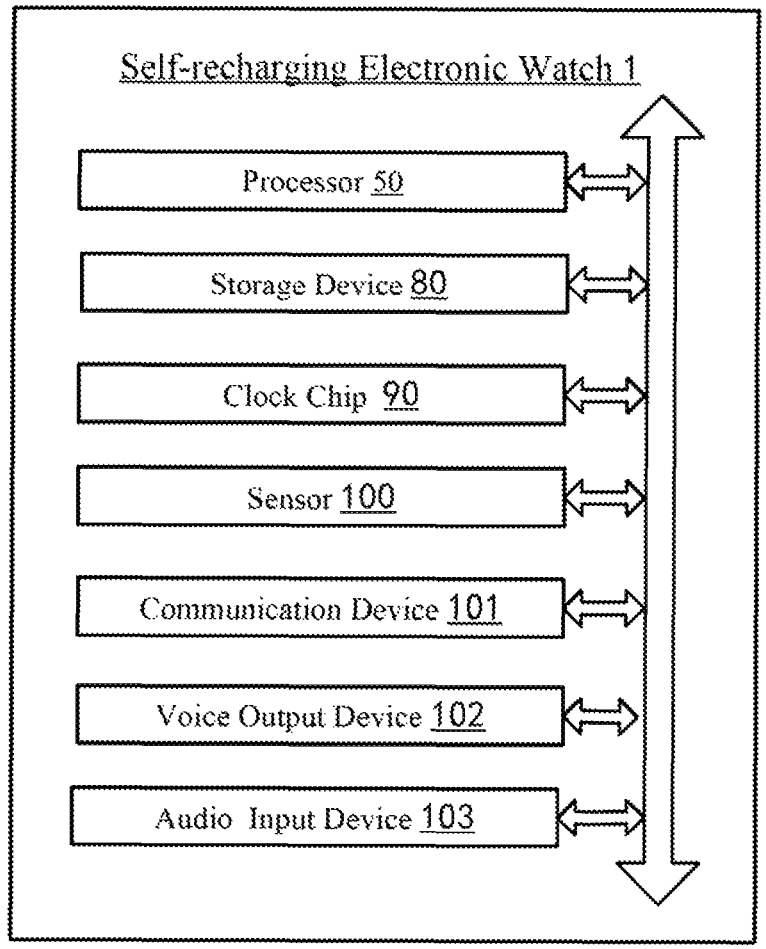
FIG. 3 is a block diagram of the self-recharging electronic watch of FIG. 1.

FIG. 3 shows a block diagram of the self-recharging charging watch 1. The self-recharging charging watch 1 includes a processor 50, a storage device 80, a clock chip 90, a number of sensors 100, a communication device 101, and a voice output device 102. The processor 50 connects to the storage device 80, the clock chip 90, the sensors 100, the communication device 101, and the voice output device 102 via system bus. The processor 50, the storage device 80, the clock chip 90, the sensors 100, the communication device 101, and the voice output device 102 are received in the receiving space 13.

The storage device 80 can include various types of non-transitory computer-readable storage mediums. For example, the storage device 80 can be an internal storage system, such as a flash memory, a Random Access Memory (RAM) for temporary storage of information, and/or a Read-Only Memory (ROM) for permanent storage of information. The storage device 80 can also be an external storage system, such as a hard disk, a storage card, or a data storage medium. The storage device 80 stores computer-readable program codes and data that perform functions of the charging watch 1.

The processor 50 can execute the computer-readable program codes and data stored in the storage device 80. For example, the processor 50 can control the flexible touch screen 40 to display information or other data to users. The clock chip 90 can record time. The sensors 100 can include a gyroscope, an accelerometer, a magnetometer, an air pressure sensor, a temperature sensor, a heartbeat sensor, and other components. The sensors 100 can detect a movement of the wrist, a rotation of the wrist, air pressure, temperature, and heartbeat of a user who wears the self-recharging electronic watch 1. The communication device 101 can receive or send wireless signals, which enables wireless communication between the self-recharging electronic watch 1 and an external device, such as a cloud server, or a mobile phone. In the embodiment, the communication device 101 can be a WiFi device, a BLUETOOTH device, or ZigBee device. The voice output device 102 can output audible information.

The processor 50 can obtain time information from the clock chip 90, and control the flexible touch screen 40 to display the obtained time information in a predefined style, such as in digital or analog form. The processor 50 can obtain information from sensors 100 and perform functions associated with the obtained information, such as storing the obtained information into the storage device 80, or sending the obtained information to an external device, such as a mobile phone.

In other embodiments, the self-recharging electronic watch 1 includes an audio receiving device 103, such as microphone, which can receive voice of users, thus enabling telephonic and voice input functions in the self-recharging electronic watch 1. The audio receiving device 103 is received in the receiving space 13.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. A self-recharging electronic watch comprising:
   a receiving body defining a receiving space;
   a watch strap connecting to the receiving body and together with the receiving body to hold the electronic watch to a wrist of a user, the watch strap comprising at least one temperature difference power generator;
   at least one flexible touch screen arranged to cover an outside surface of the watch strap, wherein the outside surface of the watch strap is opposite to an inside surface of the watch strap, the inside surface makes contact with the wrist of the user;

a processor arranged in the receiving space of the receiving body and connecting to the at least one flexible touch screen, wherein the processor controls the flexible touch screen to display information and receive commands in responses to touch operations; and a battery device arranged in the receiving space and supplying electric power for the at least one flexible touch screen and the processor;

wherein the at least one temperature difference power generator is connecting to the battery device and configured to supply power to the battery device;

wherein the at least one temperature difference power generator comprises a first semiconducting material and a second semiconducting material, the watch strap is made of the first semiconducting material and the second semiconducting material, the first semiconducting material is sandwiched between the flexible touch screen and the second semiconducting material, such that the flexible touch screen is on the outside surface of the watch strap and the second semiconducting material forms the inside surface of the watch strap.

2. The self-recharging electronic watch according to claim 1, further comprising a storage device, and a clock chip, wherein the processor executes computer-readable program codes stored in the storage device, obtains time recorded via the clock chip, and further control the at least one flexible touch screen to display the obtained time in a predefined style.

3. The self-recharging electronic watch according to claim 2, further comprising a plurality of sensors, wherein the sensors detect a movement of the wrist, a rotation of the wrist, air pressure, temperature, and heartbeat of a user who wears the self-recharging watch.

4. The self-recharging electronic watch according to claim 3, further comprising a communication device, wherein the communication device receives signals from other communication device or sends signals to other communication device.

5. The self-recharging electronic watch according to claim 4, further comprising a voice output device, wherein the voice output device is received in the receiving space.

6. The self-recharging electronic watch according to claim 5, further comprising an audio receiving device configured for receiving voice of users, which enables telephonic and voice input functions in the self-recharging watch.

7. The self-recharging electronic watch according to claim 1, wherein the first semiconducting material connects to the second semiconducting material via wires.

8. The self-recharging electronic watch according to claim 1, wherein the battery device comprises a first battery and a second battery, the first battery connects to the at least one temperature difference power generator, the second battery connects to a power charging circuit.

9. The self-recharging electronic watch according to claim 1, wherein a length and width of the first semiconducting material and the second semiconducting material correspond to a dimension of the watch strap.

10. The self-recharging electronic watch according to claim 1, wherein the at least one temperature difference power generator generates electrical power and supplies the generated power for the battery device when there is temperature difference between the first semiconducting material and the second semiconducting material.

11. The self-recharging electronic watch according to claim 1, wherein the watch strap includes more than one temperature difference power generator, the more than one temperature difference power generators connect to each other in series or in parallel.

* * * * *